United States Patent [19]

Neal

[11] 3,921,407

[45] Nov. 25, 1975

[54] OIL SPILL CONTAINING BOOM

[76] Inventor: James Henry Neal, 612 - 15 St., N.W., Calgary, Alberta, Canada

[22] Filed: June 19, 1973

[21] Appl. No.: 371,397

[52] U.S. Cl. ................................................. 61/1 F
[51] Int. Cl.² ........................................ E02B 15/04
[58] Field of Search ..... 61/1 F, 1; 210/242, DIG. 21

[56] References Cited
UNITED STATES PATENTS

| | | | |
|---|---|---|---|
| 3,659,715 | 5/1972 | Shaler et al. | 210/242 |
| 3,686,870 | 8/1972 | Blomberg | 61/1 F |
| 3,783,621 | 1/1974 | Preus | 61/1 F |

Primary Examiner—Philip C. Kannan
Attorney, Agent, or Firm—Ernest Peter Johnson

[57] ABSTRACT

The boom comprises an erect band of oil-containing mesh material attached to spaced, vertical spars. The spars comprise hollow, rigid tubes partially filled with buoyant foamed plastic. Apertures are provided in the wall of the weighted, hollow lower end of each spar to permit water to enter therein and displace the contained air. By virtue of this arrangement, the weighted end of the spar will right it when it is dropped in water. The boom is uniquely light and can be unreeled quickly from a drum for deployment around an oil spill.

3 Claims, 5 Drawing Figures

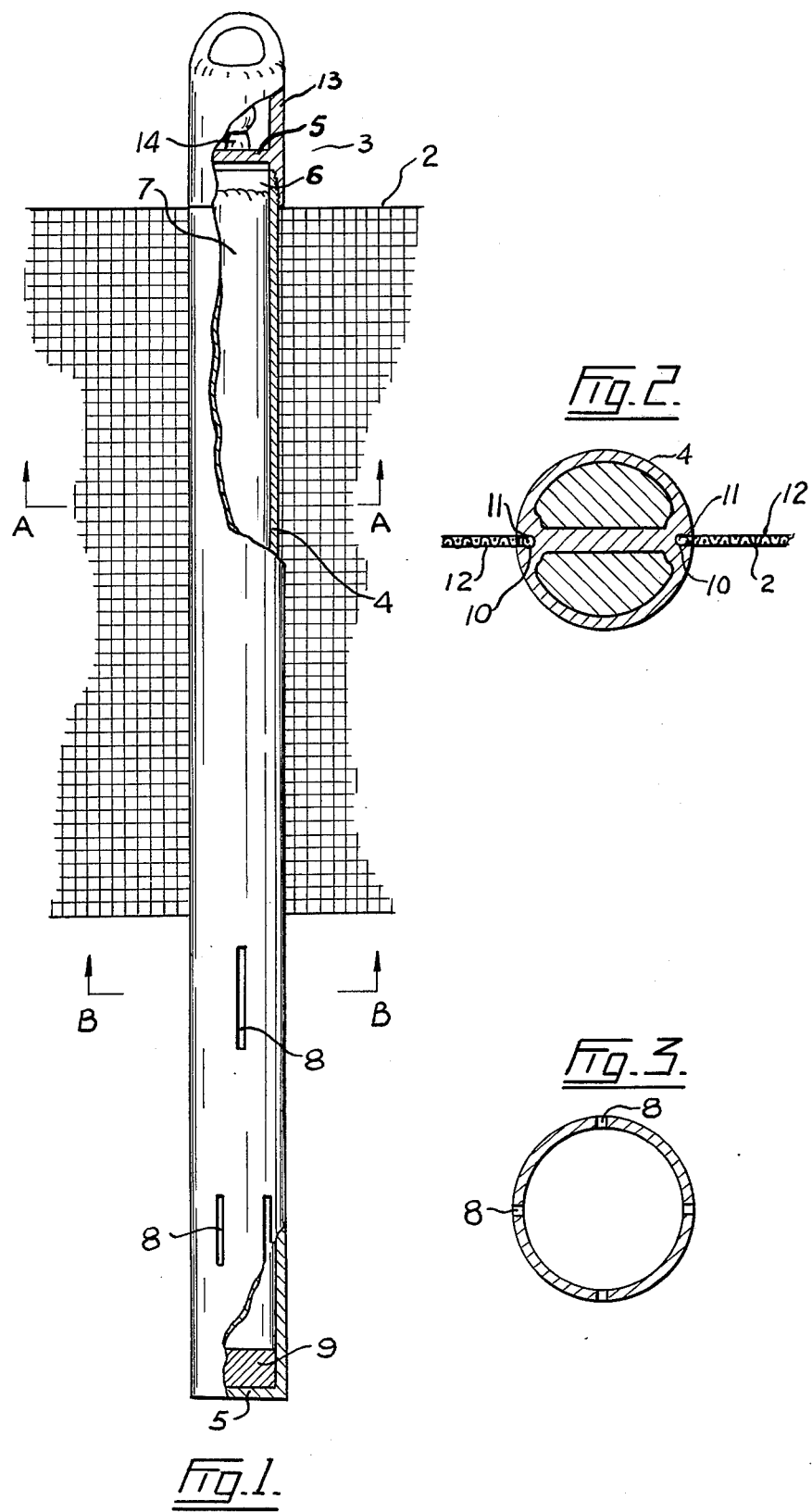

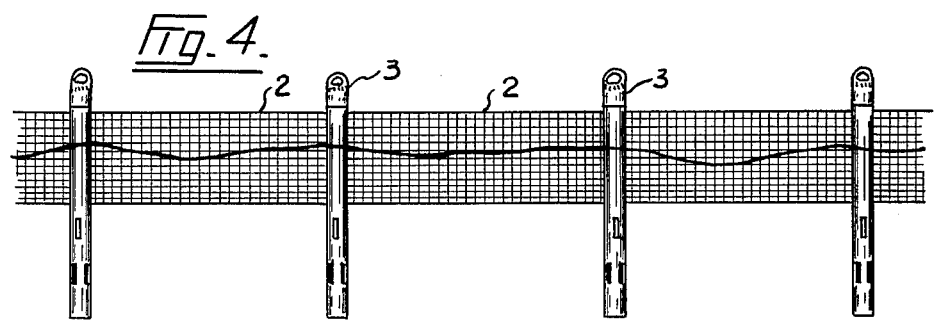
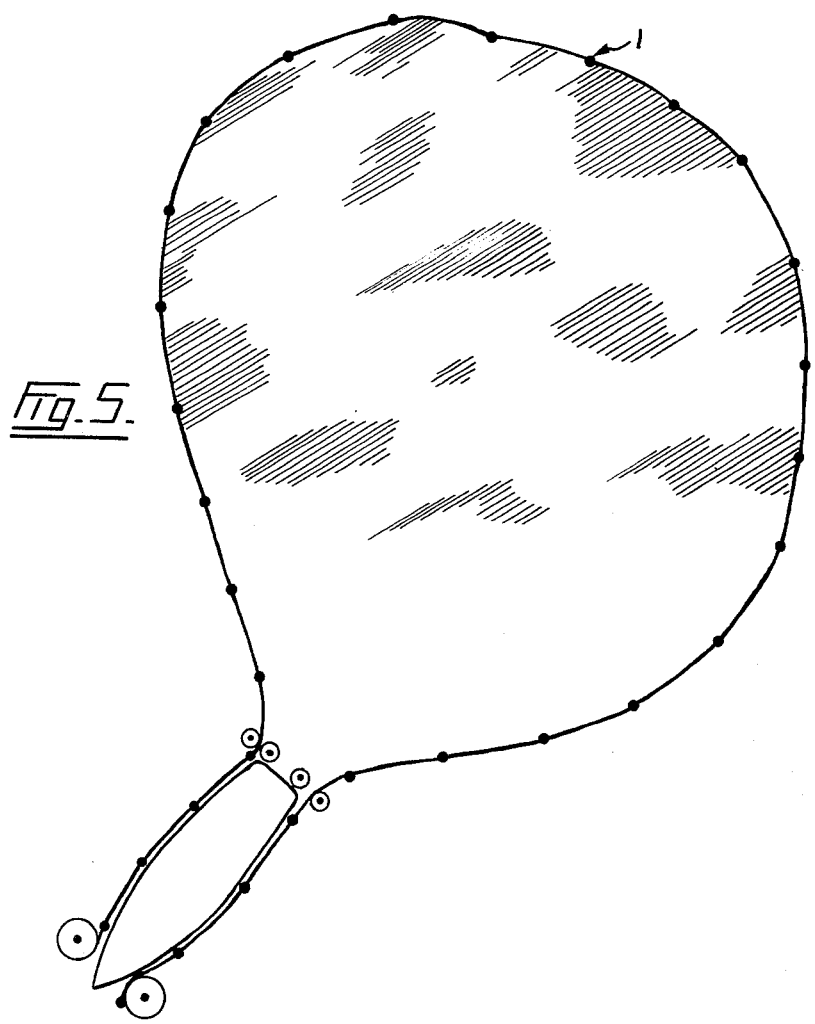

OIL SPILL CONTAINING BOOM

BACKGROUND OF THE INVENTION

This invention relates to a boom for containing an oil spill on a body of water.

More particularly, the invention is concerned with a boom of the type wherein a band of water-permeable, oil-impermeable material is suspended vertically in the water between flotation means. Heretofore, booms of this type have usually involved attaching the filtration material to a generally rigid, vertically positioned frame. The frame is then suspended from a long, horizontal float riding on the surface of the water. One known frame of this type comprises a skeleton of rectangularly-arranged horizontal and vertical metal rods having steel mesh attached thereto. The prior art is exemplified by the following U.S. Pat. Nos.: 3645099; 3389559; 3564852; 3499291; and 3537587.

Such prior art booms have relatively poor vertical stability, i.e. poor stability in roll, and have been found to flex and tip sufficiently to allow the edges of the oil slick to pass beneath the barrier portion. Furthermore, booms having horizontal float portions often prove difficult or bulky to store before use and are cumbersome to deploy.

SUMMARY OF THE INVENTION

In accordance with one aspect of the present invention, a boom is provided having light-weight, buoyant, spaced, vertical spars connected with a band of oil-containing material. The spars extend across the full width of the band and are attached to it adjacent its upper and lower edges. This arrangement is found to have good vertical stability. The spars, which can each be formed of a hollow plastic pipe partially filled with foamed plastic, are light in weight and form an integral part of the boom. The boom can quickly be deployed by unreeling it directly from a storage drum.

In a preferred feature, the spar is self-righting. That is, when dropped onto a body of water, it will automatically bring itself to the vertical position. This may be achieved by weighting the lower end of the spar and providing slots in the tube wall. When the spar hits the water, the weighted lower end submerges; water enters the lower end and drives the air out of the interior of the tube or casing. The weighted end functions to maintain the spar in a generally vertical position.

In another preferred feature, the boom may be formed in units. Each unit comprises two spars and a discrete band of filtration material stretching between them. The band is detachably connected across its width to the spars. In the event that the band or spar is damaged in use, it can be changed without seriously interrupting the containment operation.

DESCRIPTION OF THE DRAWING

In the drawing:

FIG. 1 is a side view of a spar connecting two strips of oil-containing material, with the casing broken away to show structural details;

FIG. 2 is a top section view taken along the line A—A of FIG. 1;

FIG. 3 is a top section view taken along the line B—B of FIG. 1;

FIG. 4 is a side view of the boom; and

FIG. 5 is a top view of the boom showing the manner in which it may be used.

With reference now to the Figures, the boom 1 comprises a series of erect mesh bands 2 interconnected by spaced, vertical spars 3. Each such spar extends longitudinally across the full width of the mesh band. In the embodiment shown, each mesh band 2 is discrete and connected at each of its ends to a spar. It will be appreciated that a longer band could be used, attached to more than two spars. Such an arrangement is within the scope of this invention.

The mesh band 2 is formed of longitudinally flexible, water-permeable, oil-impermeable material, which is stiff enough to hold itself erect between spars. Several such materials are commercially available. They often consist of a close weave which defines small apertures through which water will pass but which are too small to permit the passage of oil. I prefer to use polypropylene fibre. A suitable material of this type is available from the Westpoint Pepperell Company under the trade mark Mock Leno.

Each spar 3 preferably comprises a hollow, cylindrical casing 4 having end walls 5 and defining a chamber 6. The casing is quite rigid, and may satisfactorily be made of polyvinyl chloride pipe. In its upper end, the casing 4 is filled with a buoyant, water and oil-impermeable material 7, such as foamed urethane. Apertures 8 are formed in the lower end of the casing wall. The casing 4 is weighted at its lower end, as by providing a lead weight 9 in the chamber 6. When the spar is dropped onto a body of water, the weight 9 forces the lower end of the casing 4 to submerge; water enters the casing chamber 6 through the apertures 8 and replaces the air therein. The spar 3 will then right itself to the vertical position shown. Buoyancy is assured by the presence of the foamed urethane.

As stated, the mesh band 2 is preferably detachably connected at its ends to spars 3. In the embodiment shown, the casing wall is formed to define a pair of opposed grooves or openings 10 extending downwardly from the upper end of the casing 4. The length of the grooves 10 is the same as the width of the strip 2. The strip 2 is formed to provide a bulbous bead 11 along each of its terminal edges 12. To connect the strip and spar, the bead 11 is slipped into the groove 10, wherein it is retained. A cap or member 13 is screwed on to the upper end of the casing 4 to hold the bead 11 in place.

A lamp 14 or other signalling device may conveniently be mounted in the cap 13, if desired, to assist in locating the boom.

The boom 1 may quickly be deployed. Because of its lightness and integral construction, it may be carried on a drum by a launch or helicopter. It can be unreeled at the oil spill site. On contacting the water, the spars 3 automatically right temselves and hold the band 2 in a generally vertical, partially submerged position for containing the spill. The boom can be gathered in by reeling onto launch-carried reels, as shown in FIG. 5.

Obvious variations in the specific constructional details described may be made without departing from the spirit of the invention and such embodiments of the invention as come within the scope and purview of the appended claims are to be considered as part of this invention.

What is claimed is:

1. An oil-containing boom comprising, in combination:

an elongate band of longitudinally flexible, water-permeable, oil-impermeable material having sufficient stiffness transversely to maintain itself erect;

a plurality of rigid, spaced spars, buoyant throughout the greatest part of their lengths, each said spar extending longitudinally across the full width of the band and being attached thereto to form a combination which moves in water as a unit;

each said spar comprising a hollow casing, apertured and weighted at its lower end and containing a buoyant, water and oil impermeable material in its upper end, whereby, when the boom is dropped onto a body of water, the spars will right themselves and float in a generally vertical position.

2. The boom as set forth in claim 1 wherein:

the band comprises a plurality of sections interconnected at their ends by spars;

each spar comprises a hollow casing having a removable member attached thereto at its upper end, the wall of the casing forming opposed openings extending longitudinally downward from the member;

each said section having a bulbous bead along the edge of each of its ends, each said bead being received and retained within one of the openings;

said member functioning to retain the strip bead in place in the spar opening.

3. A boom for hydrocarbon containment comprising:

a plurality of spaced, substantially vertical spars and an erect band of filtration material extending between each pair of adjacent spars and attached thereto, each said spar being buoyant throughout the greatest part of its length and comprising:

a substantially rigid elongate casing having a hollow upper detachable cap section, an intermediate section, and a hollow lower section, said intermediate section being filled with a buoyant solid material which is impervious to oil and water, said lower section wall forming one or more openings to admit water thereinto, said lower section having sufficient weight whereby the spar will right itself to the substantially vertical position when floating in water, said band being flexible in a longitudinal direction but sufficiently stiff in a vertical direction so as to maintain itself erect, and means associated with the spars and band connecting the band across its full width to the spars.

* * * * *